(12) United States Patent
Mathias et al.

(10) Patent No.: US 8,874,511 B1
(45) Date of Patent: Oct. 28, 2014

(54) EFFICIENT CLEARING OF SYNCHRONIZATION INFORMATION

(75) Inventors: Razvan Mathias, Redmond, WA (US); Jochen Mathias Eisinger, Munich (DE)

(73) Assignee: Google Inc., Mountain View, CA (US)

(*) Notice: Subject to any disclaimer, the term of this patent is extended or adjusted under 35 U.S.C. 154(b) by 141 days.

(21) Appl. No.: 13/566,852

(22) Filed: Aug. 3, 2012

Related U.S. Application Data (60) Provisional application No. 61/531,565, filed on Sep. 6, 2011.

(51) Int. Cl.
*G06F 17/30* (2006.01)

(52) U.S. Cl.
USPC .......................................................... 707/620

(58) Field of Classification Search
CPC .................... G06F 17/30079; G06F 17/30117; G06F 17/30581
See application file for complete search history.

(56) References Cited

U.S. PATENT DOCUMENTS

| | | | |
|---|---|---|---|
| 2004/0133642 A1* | 7/2004 | Vazquez | 709/204 |
| 2007/0097430 A1* | 5/2007 | Kitamaru et al. | 358/1.15 |
| 2008/0310423 A1* | 12/2008 | Dekel et al. | 370/395.53 |
| 2011/0289157 A1* | 11/2011 | Pirnazar | 709/206 |
| 2011/0295958 A1* | 12/2011 | Liu et al. | 709/206 |
| 2012/0005283 A1* | 1/2012 | Provo et al. | 709/206 |
| 2012/0051401 A1* | 3/2012 | Monier et al. | 375/134 |
| 2012/0109887 A1* | 5/2012 | Ziemann et al. | 707/610 |
| 2012/0110069 A1* | 5/2012 | Hatasaki et al. | 709/203 |
| 2012/0130953 A1* | 5/2012 | Hind et al. | 707/638 |

* cited by examiner

*Primary Examiner* — Wilson Lee
(74) *Attorney, Agent, or Firm* — McDermott Will & Emery LLP (57) ABSTRACT

A computer-implemented method for deleting synchronization information in a user account is disclosed according to an aspect of the subject technology. The method comprises receiving an instruction from one of a plurality of computing devices to delete synchronization information in the user account, wherein the synchronization information is synchronized across the plurality of computing devices. The method also comprises sending an instruction to each of the other computing devices to disable synchronization, and deleting the synchronization information in the user account.

20 Claims, 5 Drawing Sheets

EFFICIENT CLEARING OF SYNCHRONIZATION INFORMATION

CROSS-REFERENCE TO RELATED APPLICATION

The present application claims the benefit of U.S. Provisional Patent Application Ser. No. 61/531,565, entitled "Efficient Clearing of Synchronization Information," filed on Sep. 6, 2011, which is hereby incorporated by reference in its entirety for all purposes.

FIELD

The subject disclosure generally relates to computing devices, and, in particular, to synchronizing information across multiple computing devices.

BACKGROUND

Information pertaining to a computer application (e.g., a web browser) may be synchronized across multiple computing devices that are used by a user. For example, a local copy of the information may be stored at each computing device. When the user works on one of the computing devices, the user may make local changes to the information at the computing device. To maintain synchronization among the computing devices, the computing device may send an update with the changes to a server. The server may store the update in a user account and send the update to the other computing devices. Upon receiving the update from the server, each of the other computing devices may update its local copy of the information accordingly. As a result, changes made to the information at one computing device are reflected at the other computing devices.

SUMMARY

A computer-implemented method for deleting synchronization information in a user account is disclosed according to an aspect of the subject technology. The method comprises receiving an instruction from one of a plurality of computing devices to delete synchronization information in the user account, wherein the synchronization information is synchronized across the plurality of computing devices. The method also comprises sending an instruction to each of the other computing devices to disable synchronization, and deleting the synchronization information in the user account.

A machine-readable medium comprising instructions stored therein is disclosed according to an aspect of the subject technology. The instructions, which when executed by a machine, cause the machine to perform operations for deleting synchronization information in a user account. The operations comprise receiving an update from one of a plurality of computing devices, updating synchronization information in the user account based on the received update, and sending the update to each one of the other computing devices, wherein each of the other computing devices updates respective local information based on the update. The operations also comprise receiving an instruction from said one of the computing devices to delete the synchronization information in the user account. The operations further comprise, in response to the received instruction, performing the steps of sending an instruction to each of the other computing devices to disable synchronization, and deleting the synchronization information in the user account.

A system for deleting synchronization information in a user account is disclosed according to an aspect of the subject technology. The system comprises one or more processors, and a machine-readable medium comprising instructions stored therein, which when executed by the one or more processors, cause the one or more processors to perform operations. The operations comprise sending an update from a computing device to a server, wherein the update indicates a change to local information at the computer and the server updates synchronization information in the user account based on the update, and receiving a command from a user to disable synchronization. The operations also comprise, in response to the command, performing the steps of disabling synchronization at the computing device, wherein the computing device ceases sending updates to the server when the local information changes, and sending an instruction from the computing device to the server to delete the synchronization information in the user account.

A computer-implemented method for deleting synchronization information in a user account is disclosed according to an aspect of the subject technology. The method comprises receiving an update at a computing device from a server, wherein the update indicates a change to synchronization information in the user account, and updating local information at the computing device based on the received update. The method also comprises receiving a command from a user to disable synchronization. The method further comprises, in response to the command, performing the steps of disabling synchronization at the computing device, wherein the computing device ceases to update the local information based on updates from the server for the user account, and sending an instruction from the computing device to the server to the delete the synchronization information in the user account.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Information pertaining to a computer application (e.g., a web browser) may be synchronized across multiple computing devices that are used by a user. For example, a local copy of the information may be stored at each computing device. When the user works on one of the computing devices, the user may make local changes to the information at the computing device. To maintain synchronization among the computing devices, the computing device may send an update with the changes to a server. The server may store the update in a user account and send the update to the other computing devices so that each of the other computing devices may update its local copy of the information accordingly. As a result, changes made to the information at one computing device are reflected at the other computing devices.

In some cases, the user may want to clear his/her information in the user account, but still want to keep the information on the computing devices. For example, the user may want to clear the information in the user account because of privacy concerns or other reason.

Various aspects of the subject technology allow a user to clear his/her information in the user account while maintaining the information on the user's computing devices. A computer-implemented method for deleting synchronization information in a user account is disclosed according to an aspect of the subject technology. The method comprises receiving an instruction from one of a plurality of computing devices to delete synchronization information in the user account, wherein the synchronization information is synchronized across the plurality of computing devices. The method also comprises sending an instruction to each of the other computing devices to disable synchronization, and deleting the synchronization information in the user account.

Various aspects of the subject technology will now be described using an example of browser information. However, it should be appreciated that the subject technology is not limited to this example, and that the subject technology may be used to synchronize any type of information across multiple computing devices.

Figure 1:
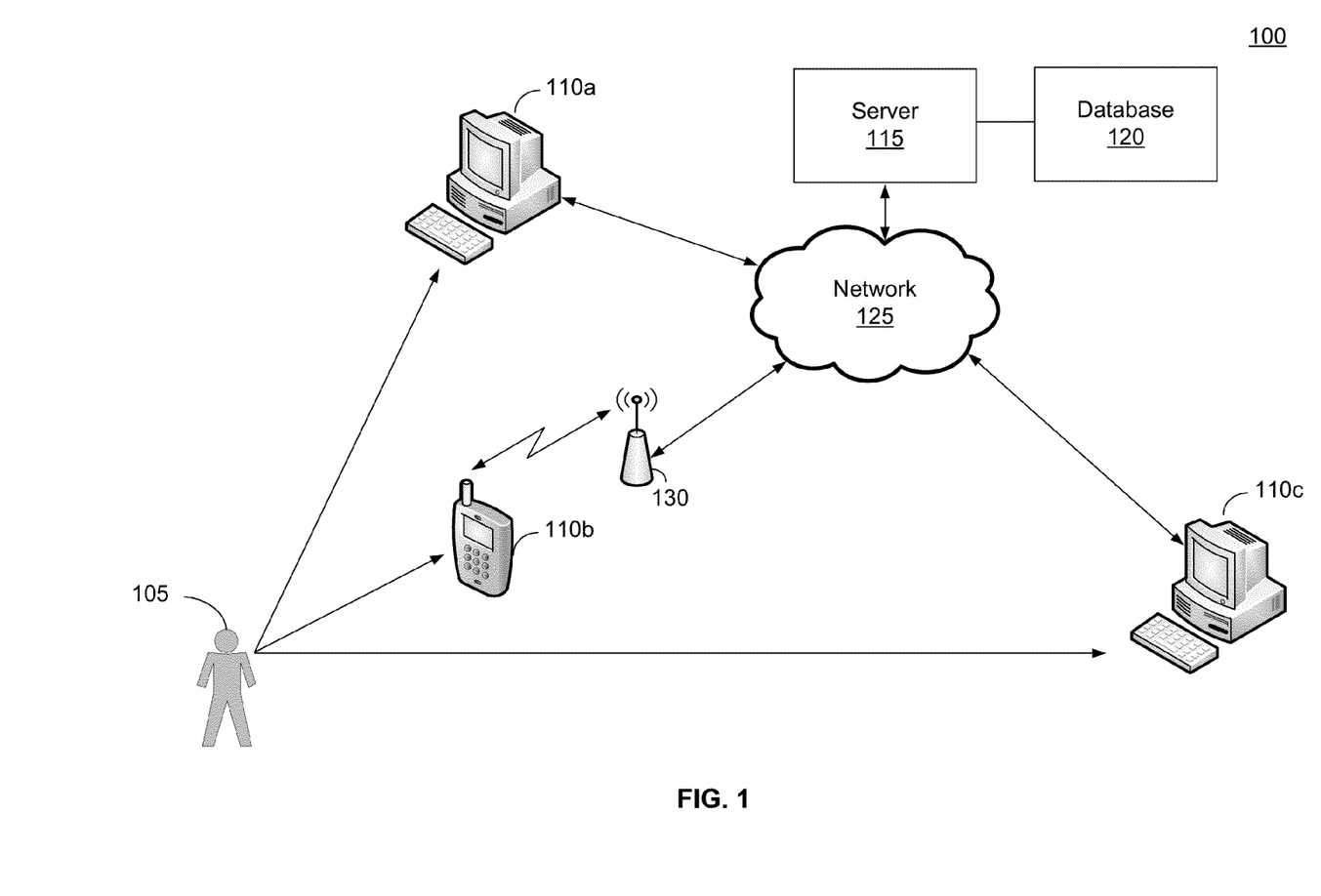
FIG. 1 is a conceptual block diagram of a system for synchronizing information across multiple computing devices according to an aspect of the subject technology.

FIG. 1 shows a system 100 for synchronizing browser information across multiple computing devices according to an aspect of the subject technology. The system 100 may comprise multiple computing devices 110a-110c, a server 115 and a database 120. Each computing device 110a-110c may be a laptop computer, a desktop computer, a tablet, a smart phone, a personal digital assistant (PDA), or other type of computing device. Each computing device 110a-110c may communicate with the server 115 over a network 125, for example, a local area network (LAN), a wide area network (WAN), an intranet and/or the Internet. In one aspect, one or more of the computing devices 110b may communicate with the network 125 via a wireless link (e.g., a WiFi wireless link, a cellular wireless link, etc.) with a base station or a wireless access point 130 connected to the network 125. While the system 100 is shown in one exemplary configuration in FIG. 1, it is to be understood that the system 100 may include additional or fewer computing devices.

In one aspect, each computing device 110a-110c may be configured to load and execute a web browser that allows a user 105 to retrieve and view web content from the network 125 (e.g., the Internet). Each computing device 110a-110c may store a local copy of browser information in a respective local memory. The browser information may comprise configuration and setting information for the web browser, browser history, and other information pertaining to the web browser. Examples of different types of browser information that may be used according to various aspects of the subject technology are provided below.

The browser information may include the user's browser preferences. The user's browser preferences may specify the home web page that is displayed in the browser window at startup. The user's browser preferences may also specify user selected browser settings.

The browser information may also include bookmarks for providing shortcuts to the user's favorite web pages. The user 105 may edit the bookmarks by adding and/or removing web pages from the bookmarks. For example, the user may add a new bookmark entry (new web page) to the bookmarks by clicking on an icon (e.g., a star icon) when the web page is displayed in the browser window and/or the URL of the web page is in the address bar.

The browser information may also include a browser history listing the web addresses (e.g., URLs) of web sites visited by the user during one or more browser sessions. The browser information may also include a list of URLs typed into the address bar by the user.

The browser information may also include tab information specifying web pages that are currently opened on the web browser. In this example, the web browser may include a tab bar with one or more tabs, where each tab represents a web page that is opened on the web browser. The tab bar allows the user 105 to navigate between multiple web pages that are opened on the web browser. For example, the user 105 may view a particular one of the web pages by clicking on the corresponding tab. The tab information may include the web address (e.g., URL) of each web page that is opened on the web browser. The tab information may be updated when the user opens or closes a tab.

The browser information may also include theme information specifying a theme of the web browser. The theme allows the user 105 to customize the look of the web browser. For example, the theme information may specify one or more user selected colors for the toolbar and frame of the web browser, and a user selected image for the background of the browser window.

The browser information may also specify one or more applications that are installed on the respective computing device 110a-110c. An application may be a web-based application that can be used within the web browser (e.g., to play a video from a web site). The browser information may also include one or more software extensions, each of which may comprise program code that adds additional functionalities to the web browser.

The browser information may also include password information for one or more web sites visited by the user 105. When the user 105 logs into a web site using a user name and a password, the web browser may store the user name and the password for future use. The user name may comprise a user email address. On subsequent visits to the web site, the web browser may automatically enter the stored user name and password so that the user does not have to reenter the user name and password each time the user visits the web site.

The browser information may also include autofill data. For example, when the user 105 enters information (e.g., name, address, phone number, etc.) into a web form, the web browser may store the entered information as autofill data. When the user 105 has to subsequently fill similar information (e.g., name, address, phone number, etc.) in the same web form or other web form, the web browser may automatically fill in some or all of the information in the web form using the stored autofill data. The autofill data may include the user's name, address, phone number, credit card information, and/or other types of information.

For the example of credit card information (e.g., credit card number, expiration date, billing address, etc.) the browser may request permission from the user before storing the credit card information as autofill data. Also, the respective computing device 110a-110c may encrypt the credit card information and send the encrypted credit card information in an update to the server 115. In this aspect, each of the other computing devices 110a-110c may receive the encrypted credit card information from the server 115, and decrypt the credit card information using a decryption algorithm. For security, the credit card information may be stored in encrypted form at the server 115. Other types of sensitive information may also be encrypted including password information.

It should be appreciated that the subject technology is not limited to the exemplary browser information given above, and that other types of browser information may also be used in addition to or in the alternative to the exemplary browser information given above.

In one aspect, the server 115 is configured to synchronize browser information across the computing devices 110a-110c. The user 105 may use different ones of the computing devices 110a-110c for web browsing at different times. For example, the user 105 may use computing device 110a (e.g., a desktop or laptop computer) for web browsing at work and/or home, and use computing device 110b (e.g., a smart phone or tablet) for web browsing on the go. By synchronizing browser information across the computing devices 110a-110c, the user's browser information (e.g., browser preferences, theme, bookmarks, browser history, etc.) is available on any one of the computing devices 110a-110c.

Each computing device 110a-110c may connect to the server 115 over the network 125. For example, the user 105 may connect a computing device 110a-110c to the server 115 by logging onto the server 115 from the computing device 110a-110c. To do this, the user 105 may enter user credentials (e.g., user name, password, etc.) at the computing device 110a-110c and the computing device 110a-110c may send the user credentials to the server 115 over the network 125. If the server 115 authenticates the user based on the received user credentials, then the server 115 may grant the computing device 110a-110c access to a user account stored on the database 120. As discussed further below, a copy of the user's browser information may be stored in the user account to synchronize the computing devices 110a-110c. The user 105 may connect multiple computing devices 110a-110c to the server 115 at a time, for example, by logging onto the server 115 from each of the computing devices 110a-110c.

To establish initial synchronization among the computing devices 110a-110c, the user 105 may enable synchronization at computing device 110a, for example, by enabling a synchronization setting on the web browser. The user 105 may then log computing device 110a onto the user account at the server, for example, by entering user credentials at computing device 110a.

Upon successful login, computing device 110a may inform the server 115 that synchronization has been enabled. Computing device 110a may then send the browser information stored locally at computing device 110a to the server 115 over the network 125.

Figure 2:
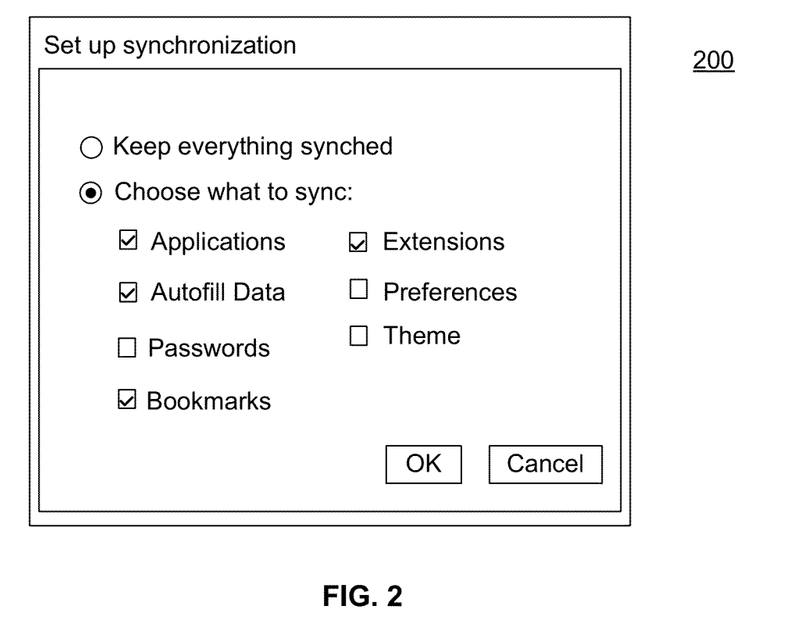
FIG. 2 is an exemplary screenshot showing a menu for selecting types of information for synchronization according to an aspect of the subject technology.

In one aspect, the user 105 may specify which types of browser information are to be synchronized across the computing devices 110a-110c. For example, when the user 105 enables synchronization at computing device 110a, computing device 110a may display a list of different types of information, as shown in the exemplary screenshot 200 in FIG. 2. The user can choose to synchronize all browser information or select different types of information individually by checking a box next to each desired type of information. In the particular example shown in FIG. 2, the user selects applications, autofill data, bookmarks and extensions for synchronization.

If the user 105 selects certain types of information for synchronization, then computing device 110a may only send browser information to the server 115 corresponding to the information types selected by the user 105. Computing device 110a may also inform the server 115 of the types of information selected by the user 105 so that only the types of information selected by the user 105 are synchronized across the computing devices 110a-110c.

Upon receiving the browser information from computing device 110a, the server 115 may store the received browser information in the user account on the database 120. The browser information stored in the user account may be referred to as synchronization information or data.

When the user logs onto the server 115 from computing device 110b and enables synchronization at computing device 110b, the server 115 may send the browser information stored in the user account to computing device 110b over the network 125. When computing device 110b receives the browser information from the server 115, computing device 110b executes a synchronization process.

First, the computing device 110b may compare the received browser information with browser information stored locally at computing device 110b. If the received browser information includes information (e.g., bookmark entries, autofill data, etc.) that is missing from the local browser information, then computing device 110b may update the local browser information to include the missing information. If the local browser information includes information (e.g., bookmark entries, autofill data, etc.) that is missing from the received information, then computing device 110b may push the missing information to the server 115. In this case, the server 115 may update the browser information (synchronization information) in the user account with the missing information and push the missing information to computing device 110a so that computing device 110a can update its local browser information accordingly.

If some of the received browser information conflicts with some of the local browser information at computing device 110b, then computing device 110b may resolve the conflict according to a conflict-resolution policy. For example, each entry (e.g., bookmark entry, autofill data entry, theme, etc.) in the received browser information and the local browser information may be time stamped with the date that the entry was created and/or last modified. In this example, when a entry in the received browser information conflicts with an entry in the local browser information, computing device 110b may resolve the conflict in favor of the entry that was most recently created or modified. If the entry in the received browser information wins the conflict, then computing device 110b may replace the entry in the local browser information with the received entry. If the entry in the local browser information wins the conflict, then computing device 110b may push the entry in the local browser information to the server 110b with instructions to replace the corresponding entry in the user account with the entry from computing device 110b. In this case, the server 115 may push the entry from computing device 110b to computing device 110a. It should be appreciated that the subject technology is not limited to the exemplary conflict-resolution policy discussed above and that other types of conflict-resolution policies may be adopted.

As a result of the synchronization process, the browser information at computing devices 110a and 110b and the browser information (synchronization information) in the user account are synchronized with one another. The process described above may be repeated for each additional computing device that the user 105 desires to synchronize with the user account.

After the computing devices 110a-110c are initially synchronized, the server 115 may maintain synchronization among the computing devices 110a-110c. When the user 105 makes local changes to the browser information (e.g., the user adds and/or deletes one or more bookmark entries) at any one of the computing devices 110a-110c, the computing device may send an update with the changes to the server 115. The server 115 may then update the browser information (synchronization information) stored in the user account based on the received update. As a result, the browser information stored in the user account is synchronized with the changes. The server 115 may then distribute the changes to each of the other computing devices 110a-110c so that each of the other computing devices can update its local browser information accordingly.

For the example in which the user 105 only selects a subset of browser information for synchronization, only the subset selected by the user 105 may be synchronized across the computing devices 110a-110c. For example, if the user 105 selects the bookmarks for synchronization, but not the theme, then the bookmarks may be synchronized across the computing devices 110a-110c while each computing device 110a-110c may have a different theme. When the user 105 selects a subset of browser information for synchronization at one computing device, the server 115 may inform the other computing devices of the user's selection so that the other computing devices only send updates for the user selected subset of browser information.

In one aspect, the server 115 may provide the user 105 with a summary of the browser information (synchronization information) stored in the user account. For example, the user 105 may log onto the user account from one of the computing devices 110a-110c. Upon successful login, the user 105 can access a web page from the server 115 providing a summary of the browser information stored in the user account.

Figure 3:
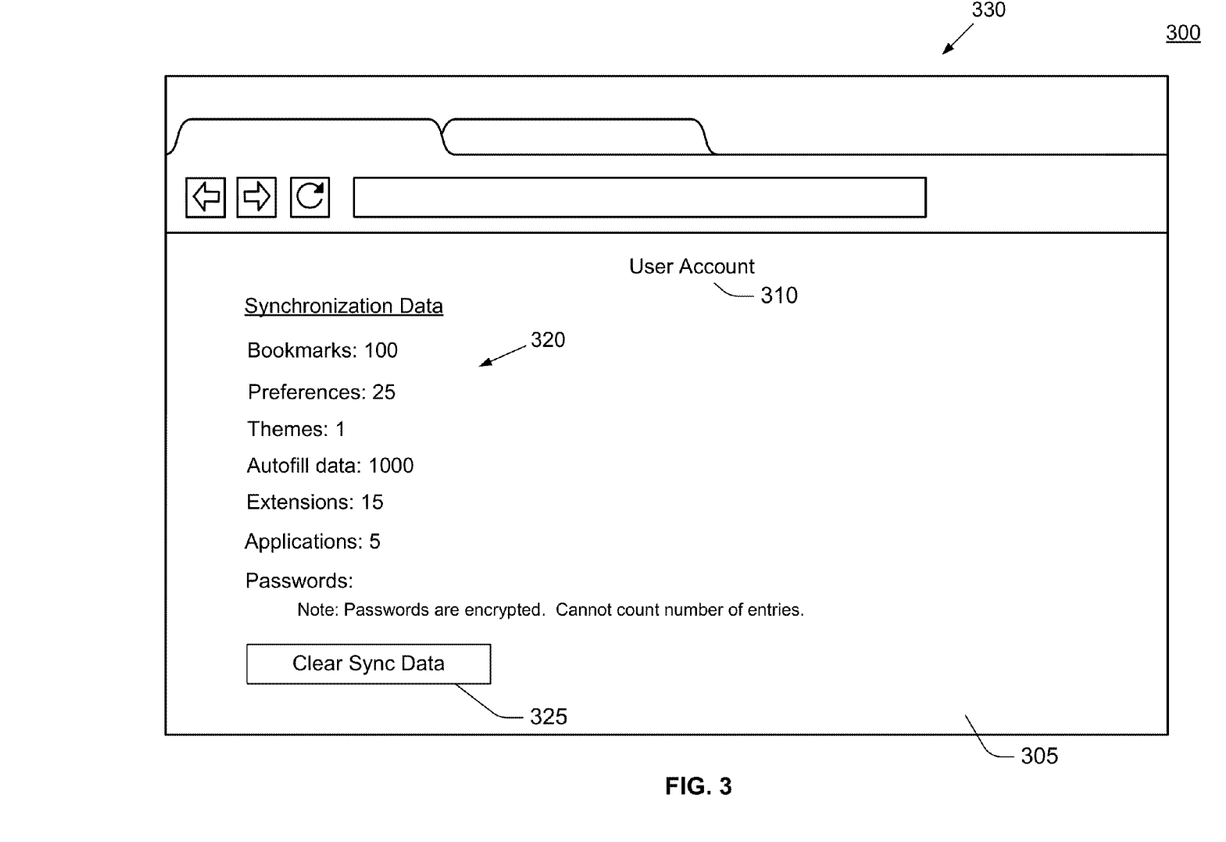
FIG. 3 is an exemplary screenshot showing a summary of information stored in a user account according to an aspect of the subject technology.

FIG. 3 shows an exemplary screenshot 300, in which a web page 305 providing a summary of the browser information stored in the user account is displayed on a web browser 330 at a computing device 110a-110c. The web page 305 includes an identifier 310 identifying the corresponding user account. The user account may be identified by a user name and/or a user email address associated with the user account.

The web page 305 also includes a summary of the browser information (synchronization information) stored in the user account. The summary lists the different types of information stored in the user account. For each type of information, the summary indicates the number of entries stored in the user account for that type of information. In the example shown in FIG. 3, the summary indicates that 100 bookmark entries are stored in the user account.

The user's passwords may be stored in encrypted form in the user account. In this case, the server 115 may not be able to count the number of entries in the user's passwords, as noted in the summary shown in FIG. 3.

The web page 350 may also include a clear button 325 for clearing the browser information (synchronization information) stored in the user account. This gives the user 105 the option of removing the user's browser information from the server 115, for example, by clicking on the clear button 325 with a pointing device (e.g., mouse, touch screen, etc.). Methods for clearing the browser information (synchronization information) in the user account according to various aspects of the subject technology are discussed further below.

The user 105 may want to clear (delete) his/her browser information in the user account, but still want to keep the browser information on the computing devices 110a-110c. For example, the user 105 may want to clear the browser information in the user account because of privacy concerns or other reason.

In one aspect, the user 105 may initiate deletion of the browser information in the user account from any one of the computing device 110a-110c. For example, the user 105 may initiate the deletion process at computing device 110a by accessing the web page 305 shown in FIG. 3 using the web browser 330 on computing device 110a and clicking on the clear button 325. In another example, the user 105 may open a dialog box on the web browser that gives the user 105 the option of deleting the browser information in the user account. In this example, the dialog box may include a clear button that the user 105 can click on to initiate the deletion process.

After the user 105 initiates the deletion process, computing device 110a may disable synchronization at computing device 110a. When synchronization is disabled, computing device 110a is disassociated (no longer synchronized) with the browser information in the user account, and no longer sends updates to the server 115 when the user makes changes to the browser information stored locally at computing device 110a. However, the computing device 110a may still receive a summary of the browser information stored in the user account from the server 115 so that the user 105 at computing device 110a may monitor the status of the deletion, as discussed further below.

Computing device 110a may also send an instruction to the server 115 over the network 125 instructing the server 115 to delete the browser information in the user account. Upon receiving the instruction, the server 115 may send a confirmation back to computing device 110a confirming that the server 115 will delete the browser information in the user account. When computing device 110a receives confirmation from the server 115, computing device 110a may display a message to the user 105 informing the user 105 that the server 115 has confirmed that the server will delete the browser information in the user account. For the example in which the user initiates deletion from the dialog box, when the computing device 110a receives confirmation from the server, the computing device 110a may close the dialog box and allow the user 105 to return to web browsing and/or performing another activity on computing device 110a.

If computing device 110a does not receive confirmation from the server 115 within a certain time period, then computing device 110a may resend the instruction to delete the browser information in the user account to the server 115.

Computing device 110a may also display a message to the user 105 that confirmation has not been received from the server 115. In this case, the user 105 may try deleting the browser information in the user account at a later time.

After receiving the instruction from computing device 110a to delete the browser information in the user account, the server 115 may disable synchronization at each of the other computing devices 110b and 110c. For example, the server 115 may send an instruction to each of the other computing devices 110b and 110c to disable synchronization. Upon receiving the instruction from the server 115, each of the other computing devices may disable synchronization at the computing device. As a result, the local browser information at each of the other computing devices 110b-110c is disassociated (no longer synchronized) with the browser information in the user account. In addition, the other computing devices cease sending updates to the server 115.

After synchronization is disabled on the computing devices 110a-110c, the server 115 may begin deleting the browser information stored in the user account. Disabling synchronization before deletion of the browser information in the user account may prevent one or more of the following problems from occurring.

If synchronization is not disabled, then after a portion or all of the browser information has deleted in the user account, another computing device 110b and 110c may determine that browser information is missing from the user account. In response, the other computing device 110b and 110c may attempt to push some or all of its local browser information to the server 115 to restore the missing browser information in the user account, defeating the purpose of the deletion.

Also, if synchronization is not disabled, then another computing device 110b and 110c may see a partial invalid state in the user account. When only a portion of the browser information in the user account has been deleted, a partial invalid state may exists in the user account. For example, bookmark entries in the browser information may be stored under folders, in which each bookmark entry refers to the corresponding folder. If the folder of a bookmark entry is deleted before the bookmark entry, then the referential integrity of the bookmark entry may be broken creating a partial invalid state. The partial invalid state may cause a computing device 110b and 110c to crash if the computing device 110a and 110c attempts to operate on the partial invalid state.

The above problems and/or other problems may be avoided by disabling synchronization before deletion of the browser information in the user account. In one aspect, the server 115 may block the user 105 from re-enabling synchronization while deletion of the browser information in the user account is in progress. For example, if the user attempts to re-enable synchronization at one of the computing devices 110a-110c and the computing device 110a-110c sends an instruction to the server 115 to enable synchronization while the deletion is still in progress, the server 115 may instruct the computing device 110a-110c to disable synchronization.

After the browser information in the user account is deleted, the user 105 may choose to keep his/her browser information off of the server (e.g., by not re-enabling synchronization). An advantage of the above aspect of the subject technology is that it allows the user 105 to delete the browser information in the user account at the server while maintaining the browser information on the computing devices 110a-110c. This is because synchronization is disabled at each computing device before the browser information in the user account is deleted. As a result, the local browser information at each computing device 110a-110c is disassociated (no longer synchronized) with the browser information in the user account and therefore is not affected by the deletion of the browser information in the user account. Therefore, the user 105 can remove the browser information from the user account at the server while keeping the browser information on the computing devices 110a-110c.

In one aspect, the user 105 may choose to re-enable synchronization after the server 115 has completed deletion of the browser information in the user account. For example, the user 105 may initiate deletion of the browser information in the user account to remove the user's passwords and/or other type of information from the user account. After the browser information in the user account has been deleted, the user 105 may re-enable synchronization. When the user 105 re-enables synchronization, the user may make sure that password information is not a type of information selected for synchronization (e.g., box next to passwords is not checked in the menu shown in FIG. 2) to prevent the user's passwords from being stored backed in the user account.

When the user re-enables synchronization at one of the computing devices 110a-110c, the computing device may push its browser information to the server 115. The server 115 may store the received browser information in the user account. Other computing devices may then be added and synchronized with the user account following the procedure described above for initial synchronization.

In one aspect, the user 105 may determine the status of a deletion by accessing the web page 305. For example, after the user 105 clicks on the clear button 325, the server 115 may update the web page 305 to display a message to the user 105 indicating that deletion of the browser information in the user account is pending or in progress. After the server 115 completes deletion of the browser information in the user account, the server 115 may update the web page 305 to indicate that there is no browser information (synchronization information) stored in the user account.

In one aspect, the server 115 may time-out the deletion process when the deletion process is not completed within a time-out period (e.g., 30 minutes). This may be done to prevent a permanent error from occurring. When the deletion process times out, the server 115 may update the web page 305 to indicate that the deletion process has timed out. Alternatively, the user 105 may infer that the deletion process has timed out when the web page 305 shows that there is still browser information stored in the user account after the user 105 expects the deletion process to be completed.

After the deletion process times out, the user 105 may restart deletion of the browser information in the user account by clicking on the clear button 325 again. In this case, the server 115 may begin deleting the remaining portion of the browser information in the user account.

The server 115 may also allow the user 105 to re-enable synchronization after the deletion process times out. In this case, the user 105 may re-enable synchronization at computing device 110a after the time out. When synchronization is re-enabled, the server 115 may send computing device 110a the portion of the browser information remaining in the user account. Computing device 110a may then compare the received portion of the browser information with the browser information stored locally at computing device 110a. Based on the comparison, computing device 110a may determine which portion of the local browser information is missing from the user account. Computing device 110a may then push the missing portion of the browser information to the server 115 to restore the full browser information in the user account.

Although various aspects of the subject technology are described using the example of browser information, its should be appreciated that the subject technology is not limited to this example. The subject technology may be used to deleted any type of information that is synchronized across multiple computing device. For example, the subject technology may be used to delete email information that is synchronized across multiple computing devices. Therefore, synchronization information or data may refer to any information that is synchronized across multiple computing devices.

Figure 4:
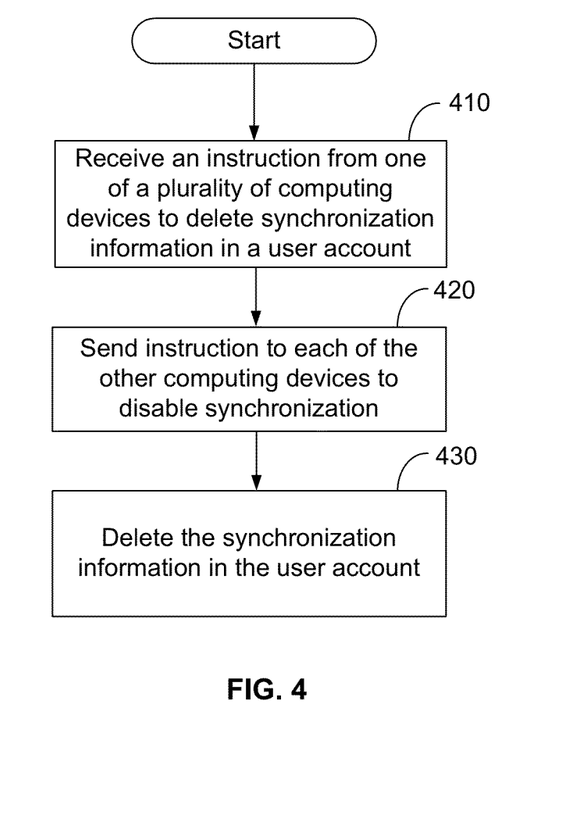
FIG. 4 is a flowchart of a method for deleting synchronization information in a user account according to an aspect of the subject technology.

FIG. 4 is a flowchart showing a method for deleting synchronization information in a user account according to an aspect of the subject technology.

In step 410, an instruction is received from one of a plurality of computing devices to delete synchronization information in a user account, wherein the synchronization information is synchronized across the plurality of computing devices.

In step 420, an instruction is sent to each of the other computing devices to disable synchronization.

In step 430, the synchronization information in the user account is deleted.

Figure 5:
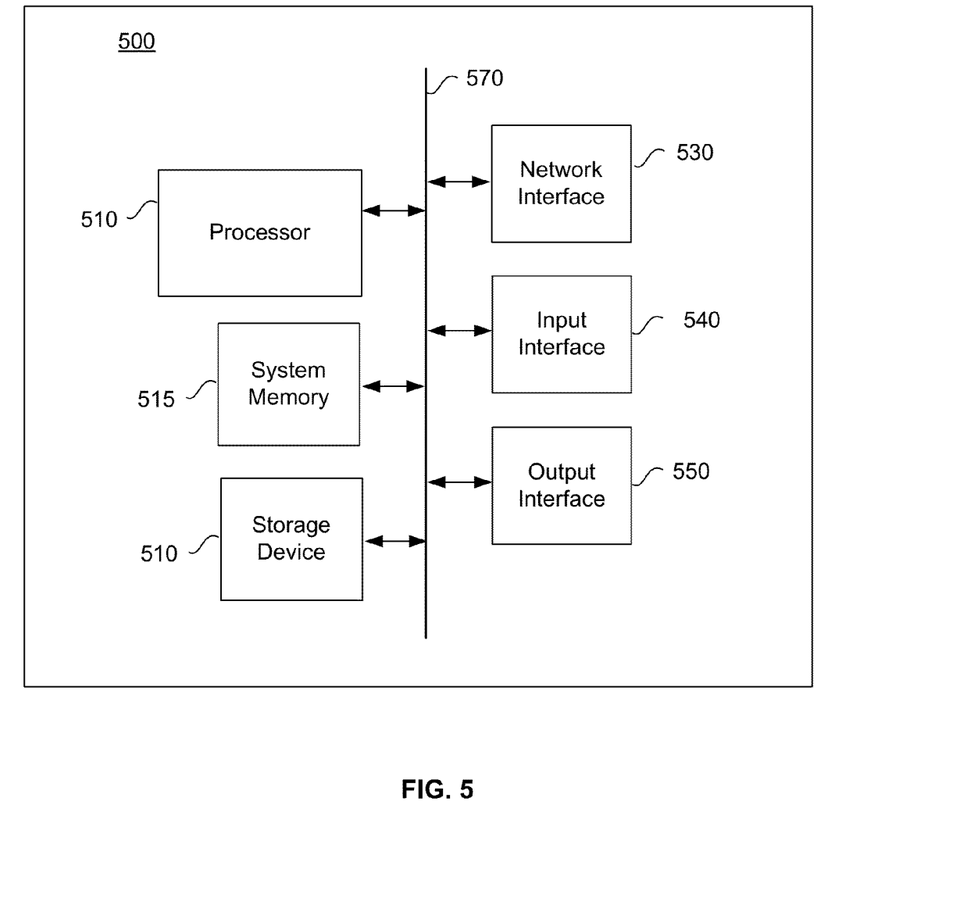
FIG. 5 conceptually illustrates an electronic system with which some implementations of the subject technology are implemented.

FIG. 5 conceptually illustrates an electronic system 500 with which some implementations of the subject technology are implemented. The electronic system 500 can be used to implement anyone of the computing devices 110a-110c shown in FIG. 1. While the electronic system 500 is shown in one configuration in FIG. 5, it is to be understood that the electronic system 500 may include additional, alternative and/or fewer components.

In the example shown in FIG. 5, the electronic system 500 includes a processor 510, system memory 515, a storage device 520, a network interface 530, an input interface 540, an output interface 550, and a bus 570. The bus 570 collectively represents all system, peripheral, and chipset buses that communicatively connect the numerous components of the electronic system 500. For instance, the bus 570 communicatively connects the processor 510 with the system memory 515 and the storage device 520. The processor 510 may retrieve instructions from one or more of these memories and execute the instructions to implement processes according to various aspects of the subject technology. The processor 510 may comprise a single processor or a multi-core processor in different implementations.

The storage device 520 may comprise a solid state drive, a magnetic disk, or an optical drive. The storage device 520 may be used to store an operating system (OS), programs, and/or files. The system memory 515 may comprise volatile memory (e.g., a random access memory (RAM)) for storing instructions and data that the processor 510 needs at runtime. Instructions for performing processes according to various aspects of the subject technology may be stored in the storage device 520 and loaded into the system memory 515 during runtime for execution by the processor 510. For example, a web browser application may be stored in the storage device 520 and loaded into the system memory 515 during runtime for execution by the processor 510. Also, the processor 510 may store local changes to the browser information in the system memory 515 and later write the local changes to the storage device 520 for long term storage of the changes. A local copy of the browser information may be stored in the system memory 515 and/or the storage device 520.

The network interface 530 enables the processor 510 to communicate with the server 115 over the network 125 (e.g., a local area network (LAN), a wide area network (WAN), an intranet, the Internet, etc.). The network interface 530 may include a wireless communication module for communicating with a base station or wireless access point 130 connected to the network 125 over a wireless link (WiFi wireless link, cellular wireless link, etc.).

The input interface 540 enables the user 105 to communicate information and commands to the processor 510. For example, the input interface 540 may be coupled to an alphanumeric keyboard and/or a pointing device (e.g., touch pad or mouse) to receive commands from the user 105.

The output interface 550 enables the processor 510 to communicate information to the user 105. For example, the output interface 550 may be coupled to a display (e.g., liquid crystal display (LCD)) and/or a printer to output information from the processor 510 to the user 105.

Many of the above-described features and applications may be implemented as a set of machine-readable instructions stored on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this disclosure, the term "software" and "program" is meant to include firmware or applications stored in a memory, which can be executed by a processor. Also, in some implementations, multiple software aspects can be implemented as sub-parts of a larger program while remaining distinct software aspects. In some implementations, multiple software aspects can also be implemented as separate programs. Finally, any combination of separate programs that together implement a software aspect described here is within the scope of the disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computers and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for deleting synchronization information in a user account, the method comprising:
   receiving, by a server, an instruction from one of a plurality of computing devices to delete synchronization information in the user account, wherein the synchronization information is synchronized with respective local information across the plurality of computing devices;
   in response to receiving the instruction to delete synchronization information, sending, by the server, an instruction to each of the other computing devices to disable synchronization; and
   deleting, by the server, the synchronization information in the user account.

2. The method of claim 1, wherein sending the instruction to each of the other computing devices is performed prior to deleting the synchronization information in the user account.

3. The method of claim 1, wherein the synchronization information comprises at least one of tab information, bookmark information, login information, theme information, or browser history.

4. The method of claim 1, further comprising, after a portion of the synchronization information has been deleted from the user account, sending at least one of the computing devices a message indicating another portion of the synchronization information still in the user account.

5. The method of claim 1, further comprising, after the synchronization information has been deleted from the user account, sending at least one of the computing devices a message indicating that the synchronization information has been deleted from the user account.

6. A non-transitory machine-readable medium comprising instructions stored therein, which when executed by a machine, cause the machine to perform operations for deleting synchronization information in a user account, the operations comprising:
   receiving an update from one of a plurality of computing devices;

updating synchronization information in the user account based on the received update;

sending the update to each one of the other computing devices, wherein each of the other computing devices updates respective local information based on the update;

receiving an instruction from said one of the computing devices to delete the synchronization information in the user account;

in response to the received instruction, performing the steps of:

sending an instruction to each of the other computing devices to disable synchronization; and deleting the synchronization information in the user account.

7. The non-transitory machine-readable medium of claim 6, wherein sending the instruction to each of the other computing devices is performed prior to deleting the synchronization information in the user account.

8. The non-transitory machine-readable medium of claim 6, wherein the synchronization information comprises at least one of tab information, bookmark information, login information, theme information, or browser history.

9. The non-transitory machine-readable medium of claim 6, wherein the operations further comprise, after a portion of the synchronization information has been deleted from the user account, sending at least one of the computing devices a message indicating another portion of the synchronization information still in the user account.

10. The non-transitory machine-readable medium of claim 6, wherein the operations further comprise, after the synchronization information has been deleted from the user account, sending at least one of the computing devices a message indicating that the synchronization information has been deleted from the user account.

11. A system for deleting synchronization information in a user account, the system comprising:

one or more processors; and a machine-readable medium comprising instructions stored therein, which when executed by the one or more processors, cause the one or more processors to perform operations comprising:

sending an update from a computing device to a server, wherein the update indicates a change to local information at the computing device and the server updates synchronization information in the user account based on the update;

receiving a command from a user to disable synchronization;

in response to the command, performing the steps of:

disabling synchronization at the computing device, wherein the computing device ceases sending updates to the server when the local information changes; and sending an instruction from the computing device to the server to delete the synchronization information in the user account.

12. The system of claim 11, wherein the synchronization information comprises at least one of tab information, bookmark information, login information, theme information, or browser history.

13. The system of claim 11, wherein the operations further comprises receiving a message at the computing device from the server, the message indicating a portion of the synchronization information still in the user account after another portion of the synchronization information has been deleted from the user account.

14. The system of claim 11, wherein the operations further comprises receiving a message at the computing device from the server, the message indicating that the synchronization information has been deleted from the user account.

15. The system of claim 11, wherein the operations further comprise:

after synchronization has been disabled at the computing device, receiving a command from the user to re-enable synchronization;

in response to the command to re-enable synchronization, performing the steps of:

sending an instruction from the computing device to the server to enable synchronization at the server; and sending at least a portion of the local information at the computing device to the server.

16. The system of claim 12, wherein the instruction to enable synchronization identifies each of a plurality of different types of information to be synchronized.

17. A computer-implemented method for deleting synchronization information in a user account, the method comprising:

receiving an update at a computing device from a server, wherein the update indicates a change to synchronization information in the user account;

updating local information at the computing device based on the received update;

receiving a command from a user to disable synchronization;

in response to the command, performing the steps of:

disabling synchronization at the computing device, wherein the computing device ceases to update the local information based on updates from the server for the user account; and sending an instruction from the computing device to the server to delete the synchronization information in the user account.

18. The method of claim 17, wherein the synchronization information comprises at least one of tab information, bookmark information, login information, theme information, or browser history.

19. The method of claim 17, further comprising receiving a message at the computing device from the server, the message indicating a portion of the synchronization information still in the user account after another portion of the synchronization information has been deleted from the user account.

20. The method of claim 17, further comprising receiving a message at the computing device from the server, the message indicating that the synchronization information has been deleted from the user account.

* * * * *